(12) United States Patent
Watrin et al.

(10) Patent No.: US 8,317,567 B2
(45) Date of Patent: Nov. 27, 2012

(54) MOULDED TEXTILE LINGERIE ITEM WITH SUPPORT REGION MADE FROM SILICONE

(75) Inventors: Francis Watrin, Lucenay l'Evêque (FR); Manon Turlan, Marmagne (FR)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 0 days.

(21) Appl. No.: 12/960,830

(22) Filed: Dec. 6, 2010

(65) Prior Publication Data

US 2011/0076408 A1 Mar. 31, 2011

Related U.S. Application Data

(62) Division of application No. 10/543,909, filed as application No. PCT/FR2004/000206 on Jan. 29, 2004, now Pat. No. 7,862,401.

(30) Foreign Application Priority Data

Feb. 3, 2003 (FR) ..................................... 03 01193

(51) Int. Cl.
*A41C 3/00* (2006.01)
(52) U.S. Cl. ............... 450/39; 450/92; 450/93; 264/134
(58) Field of Classification Search .................... 450/39, 450/54–58, 92, 93; 2/267, 268, 73; 264/134
See application file for complete search history.

(56) References Cited

U.S. PATENT DOCUMENTS

| | | | |
|---|---|---|---|
| 3,981,310 A | 9/1976 | Donaghy | |
| 4,372,321 A * | 2/1983 | Robinson | ......................... 450/39 |
| 4,432,364 A | 2/1984 | Martini | |
| 4,795,600 A * | 1/1989 | Kromrey | ......................... 264/130 |
| 4,945,127 A * | 7/1990 | Kagawa et al. | ............... 524/524 |
| 5,057,252 A * | 10/1991 | Kagawa et al. | ............... 264/416 |
| 5,154,659 A * | 10/1992 | Gluckin | ......................... 450/39 |
| 5,783,137 A * | 7/1998 | Alives Porta | ................. 264/510 |
| 5,855,124 A | 1/1999 | Donaghy et al. | |
| 6,332,825 B1 * | 12/2001 | Henricksen | ..................... 450/81 |
| 6,425,800 B1 * | 7/2002 | Huang | ............................. 450/41 |
| 2005/0003736 A1 * | 1/2005 | Bentham | ......................... 450/75 |
| 2005/0266770 A1 * | 12/2005 | Henricksen | ..................... 450/1 |

FOREIGN PATENT DOCUMENTS

| | | |
|---|---|---|
| DE | 9107681 | 11/1991 |
| DE | 20000635 | 8/2000 |
| DE | 10112251 | 10/2002 |
| EP | 0809945 | 12/1997 |
| FR | 2779325 | 12/1991 |
| FR | 2749167 | 12/1997 |
| FR | 2808972 | 11/2001 |
| GB | 1171063 | 11/1969 |
| JP | 07278909 | 10/1995 |
| WO | 9809013 | 3/1988 |

\* cited by examiner

*Primary Examiner* — Gloria Hale
(74) *Attorney, Agent, or Firm* — Ohlandt, Greeley, Ruggiero & Perle, LLP

(57) ABSTRACT

An article made of elastic textile material comprising at least one zone intended to be shaped by thermal molding is provided. The at least one zone has at least over one part a support region in which the textile material is coated, prior to thermal molding, with a non-moldable material with shape-memory. The article is, in particular, a brassiere coated with silicone in the zone of the cups of the brassiere.

12 Claims, 1 Drawing Sheet

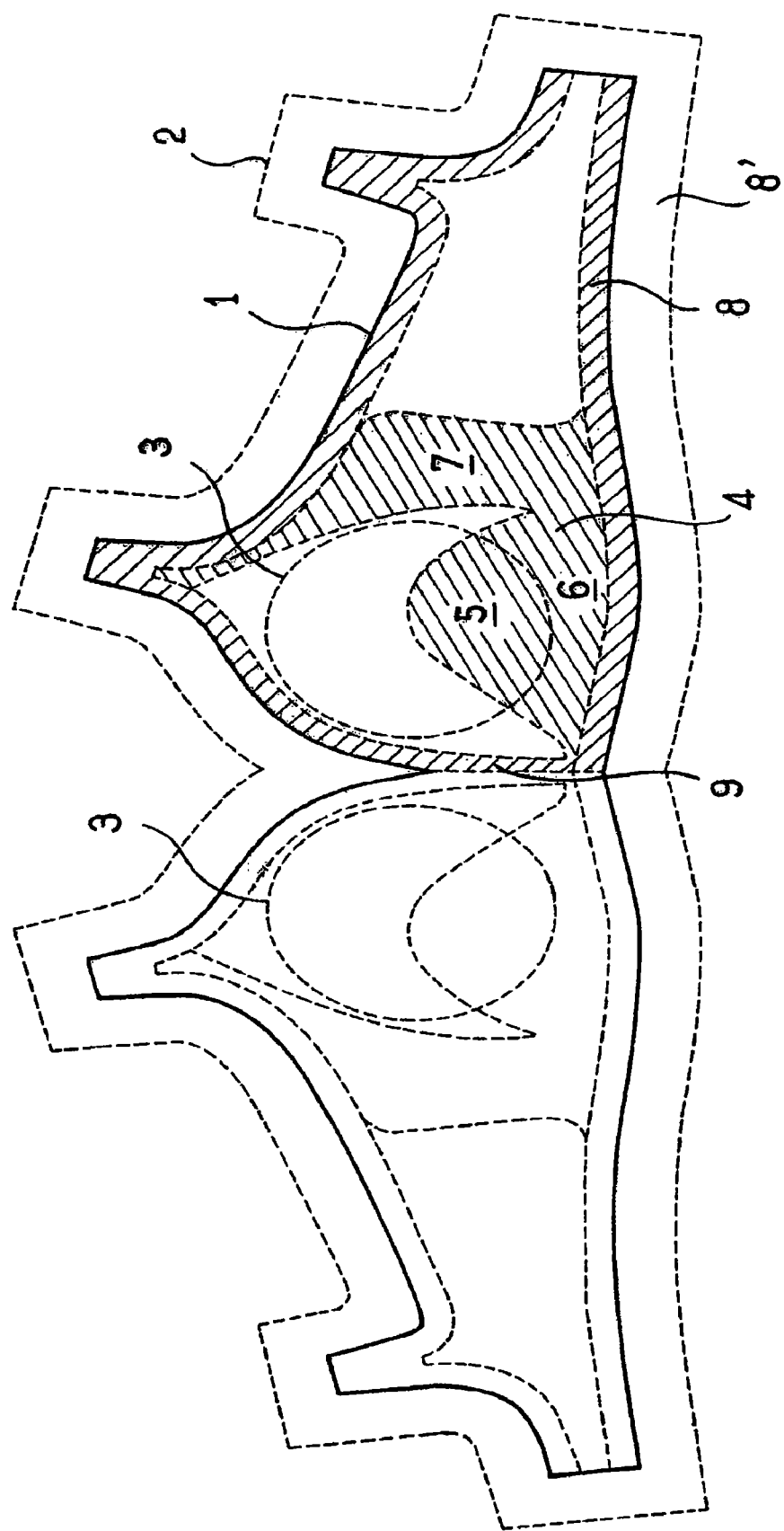

MOULDED TEXTILE LINGERIE ITEM WITH SUPPORT REGION MADE FROM SILICONE

CROSS-REFERENCE TO RELATED APPLICATIONS

This application is a division of U.S. application Ser. No. 10/543,909, filed on May 8, 2006 now U.S. Pat. No. 7,862,401, now pending, which claims the priority of International Patent Application No. PCT/FR2004/000206 filed on Jan. 29, 2004, which claims priority of French Patent Application No. 0301193 filed on Feb. 3, 2003, the entire contents of all of which are incorporated by reference herein.

BACKGROUND OF THE INVENTION

1. Field of the Invention

The present invention relates to undergarments, in particular to a brassiere.

2. Description of Related Art

Production a brassiere made of elastic textile providing the wearer with a sensation of lightness and comfort, is often counteracted by the reinforcement and support devices for correctly maintaining the bust notwithstanding the elasticity of the textile material. These devices can comprise frameworks as in the conventional configuration, said frameworks being generally considered unpleasant, or of reinforcing textile layers, as disclosed for example in EP 0 809 945, teaching reinforcement parts fused together or laminated but having the drawback of stiffening the garment and nullifying its expandability.

Similarly, manufacturing of the brassiere is, for example, disclosed in U.S. Pat. No. 3,981,310, U.S. Pat. No. 4,432,364, U.S. Pat. No. 5,855,124 or U.S. Pat. No. 5,154,659 in which the cups of the brassiere are thermally molded. However, the resulting comfort and support obtained using these techniques leaves much to be desired.

BRIEF SUMMARY OF THE INVENTION

The object of the invention is to provide a brassiere with the feature of effective but not uncomfortable support for the wearer.

This object is achieved in the context of a textile article made of elastic material comprising at least one zone intended for forming by thermal molding, wherein, according to the invention, the article comprises at least over one part of said zone a support region in which the textile material is covered prior to thermal molding with a non-moldable material with shape-memory.

The term non-moldable material with shape-memory is defined as a material which, when it is molded simultaneously to a textile layer on which it is disposed, tends to elastically recover after molding the initial shape it had prior to molding and thus exerts an elastic holding action on the textile material to which it is bonded.

The shape memory material is advantageously a medical class silicone rubber which is deposited onto a reticulated zone on the textile material before thermal molding of the article. It is preferably a bi-component thermally vulcanizable elastomer of the type known as LSR (liquid silicone rubber); such an elastomer polymerizes by polyaddition reaction at 150 degrees Celsius (° C.). It is an elastomer of the polymethyl siloxane type with vinyl groups and charges for which a platinum catalyst and an accelerator of the same type can be used.

When the silicone is deposited on the textile, it tends to stick to the fibers during reticulation and unites quite well with the fabric.

The silicone can be deposited by coating or by impression or by any other process. The silicone layer deposited can form ridges or it can be smooth. The layer can be deposited in such a way as to form a continuous layer or, in contrast, to produce a network of textile fibers on which it is deposited following the natural holes formed by the network of the weave. The silicone layer can be deposited by impression so as to form a pattern for an undergarment article or any other design. The textile material coated with the silicone can be coated with another material or with the same textile so as to create a textile—silicone—textile complex. In this case, the silicone acts as the adhesive between the two textile materials.

Deposition can be done using a defined pattern or a panel (the pattern is then subsequently cut-out).

In the preferred but non-exclusive application of the invention, the article is a brassiere and the molded zones are the cups of the brassiere.

Advantageously, the support region extends principally over the lower part of the cups. Preferably, the region forms a surface representing at least the half of the lower part of the cups. Advantageously, the region forms an angular segment of the cups.

Advantageously still, the support region extends to the skirt portion situated under the cup; further, the support region can comprise a continuous lateral vertical part, external to the cup.

The utilization of silicone in undergarments is not new. In general, silicone is used for its adhesive properties that provide anti-slip features. Accordingly, the patents FR 2 749 167, DE 200 00 635 teaches strips of anti-skid silicone strips for panties, stockings and tights. Patents GB 1 171 063 and WO 98/09013 disclose tights or the like whose one part is impregnated with silicone for producing in situ the anti-slip part. An undergarment having an elastic edge is also known, for example, from patent FR 2 808 972 of the Applicant. As disclosed in patent U.S. Pat. No. 6,322,825 a brassiere is known in which several silicone bands in thin layers are placed over different zones of the article, including over the cups. However, these zones remain in the form of reduced bands and above all are not applied before thermal molding so as to effect an elastic holding action.

Similarly, patent FR 2 779 325, filed on behalf of the Applicant, discloses a molded silicone shell, that may be incorporated into the textile of the brassiere. The silicone is in a considerable quantity in said shell and is of such a nature as to allow molding in a shape. In contrast, according to the present invention, the silicone does not form a shell with the textile layer but simple coating done under conditions that do not mold the shape of the silicone and, on the contrary, allows it a memory of its former planar shape.

By virtue of the invention a light product is obtained without reinforcement that enables correcting the principal curvature of the bust. The silhouette is improved in such a fashion to present was considered impossible to achieve using such light textiles.

Other advantages and features will become obvious when reading the following description with reference to the single figure appended hereto, which represents a blank of the brassiere with its different zones and regions according to the invention.

BRIEF DESCRIPTION OF THE SEVERAL VIEWS OF THE DRAWINGS

The single FIGURE is a perspective view of a brassiere with its different zones and regions according to the invention.

DETAILED DESCRIPTION OF THE INVENTION

The brassiere 1 is produced using a blank 2 made of a piece of textile produced from a light and elastic material. It is advantageously a synthetic silk charmeuse fabric (polyester or polyamide) and containing an Olsten. Advantageously, its weight in grams per square meter (m$^2$) is not greater than 100 g/m$^2$, but in the case of specific textiles such as knitted double-fabric articles, the weight can be up to 400 g/m$^2$. Its manual expansion is at least 80% in both directions. The blank forms two symmetrical panels, each one of which comprises a zone 3 for forming, after thermal shaping, the cups of the brassiere.

According to the invention, silicone is deposited onto the textile material comprising the blank, at least in on region 4 which overlaps at least the zone 3. The region 4 comprises advantageously at least the bottom part of the zone 3, for example, a part corresponding substantially to a sector 5 of one quarter to one third of the zone 3, continuing into the zone 6 of the skirt of the brassiere and, eventually, through a lateral zone 7 joining the lower edge and the upper edge of a panel and situated outside of the zone 3 of the cup. The silicone is advantageously deposited in a thickness of preferably between 0.5 millimeter (mm) and 1 mm and in such a fashion as to form a solid covering a relatively wide zone of the lower part of the cup, in contrast with the bands deposited according to the prior art.

Furthermore, the silicon is also advantageously deposited, in a fashion known per se, on the edges 8 of the panels and in the median zone 9 of the panels. In fact, the silicone is deposited also on the marginal zone 8 of the blank 2, which enables clean cutting and eliminates stitching of the edge of the brassiere 1.

The silicone can be deposited in order to be situated only on the inner side of the brassiere or, in the alternative, only on the outer side.

After depositing of the silicone, the brassiere is passed through an oven, whose temperature is between 1500 and 2000 for 30 seconds to 2 minutes. The undergarment article is then thermoshaped on a cup-shaping mold, in which the temperature reaches the order of 180 degrees Celsius (° C.). The textile base is deformed and keeps its new shape while the silicone covering it tends to resume its initial shape and thus imposes an elastic stress on the article that is capable of supplying a hold to the bust and an elegant curvature.

It is possible, but unnecessary, to combine the invention with more conventional reinforcing elements, if desired, such as frameworks or reinforcing bands.

The invention has been described with reference to a brassiere, which comprises its preferred embodiment. Nevertheless, the same principle can be applied to men's briefs having a molded support zone comprising a non-molded layer of silicone.

What is claimed is:

1. A method of forming a textile article, comprising:
   depositing a silicone coating on at least a portion of a zone of a textile base;
   exposing the silicone coating to a process so that the silicone coating forms a solid coating on the portion of the zone; and
   thermoshaping the portion of the zone of the textile base to a molded shape so that the zone of said textile base keeps said molded shape while said silicone coating does not retain the molded shape,
   wherein the molded shape comprises a pair of molded breast cups.

2. The method of claim 1, wherein said textile base is an elastic textile.

3. The method of claim 1, wherein the step of depositing said silicone coating on at least said portion of said zone comprises depositing said silicone coating on a support region extending over a lower part of each of said pair of molded breast cups.

4. The method of claim 3, wherein said support region forms a surface representing at least half of said lower part of said pair of molded breast cups.

5. The method of claim 3, wherein said support region forms an angular section of said pair of molded breast cups.

6. The method of claim 3, wherein said support region extends to a skirt portion under said pair of molded breast cups.

7. The method of claim 3, wherein said support region comprises a continuous lateral vertical part exterior to said pair of molded breast cups.

8. The method of claim 1, wherein said silicone coating comprises a shape memory elastomer material.

9. The method of claim 8, wherein said shape memory elastomer material comprises silicone rubber.

10. The method of claim 9, wherein said silicone rubber is a thermally vulcanizable elastomer and wherein said process comprises a thermal vulcanization process.

11. The method of claim 9, wherein said silicone rubber comprises a bi-component thermally vulcanizable elastomer.

12. The method of claim 1, wherein depositing said shape memory elastomer material comprises coating said shape memory elastomer material to a thickness of between 0.5 mm to 1.0 mm.

\* \* \* \* \*